United States Patent [19]

Shibata

[11] Patent Number: 5,469,570
[45] Date of Patent: Nov. 21, 1995

[54] SYSTEM FOR EXAMINING STATUSES OF TASKS WHEN ONE TASK IS INTERRUPTED IN DATA PROCESSING SYSTEM

[75] Inventor: Tsugikazu Shibata, Tokyo, Japan

[73] Assignee: NEC Corporation, Tokyo, Japan

[21] Appl. No.: 284,048

[22] Filed: Aug. 1, 1994

Related U.S. Application Data

[63] Continuation of Ser. No. 612,666, Nov. 14, 1990, abandoned.

[30] Foreign Application Priority Data

Nov. 14, 1989 [JP] Japan ................................. 1-295294

[51] Int. Cl.$^6$ ............................................. G06F 15/163
[52] U.S. Cl. ........................... 395/650; 364/DIG. 1; 364/281.3; 364/228.1; 364/228.3; 364/231.9
[58] Field of Search ................................. 395/650, 725, 395/575

[56] References Cited

U.S. PATENT DOCUMENTS 3,312,951  4/1967  Hertz ......................................... 364/200
3,421,150  1/1969  Quosig et al. ............................ 364/200
4,263,647  4/1981  Merrell et al. ........................... 364/101
5,060,140  10/1991  Brown et al. ............................. 364/200

*Primary Examiner*—Thomas M. Heckler
*Attorney, Agent, or Firm*—Foley & Lardner

[57] ABSTRACT

Multiple CPU's are assigned to multiple tasks on a one-to-one basis and execute corresponding tasks under the control of an operating system. Each of the CPU has a transmitter and a receiver. Each transmitter of the CPU's is connected to the receivers in the remainder of the CPU's. The CPU's are arranged so that, in response to the execution of an interrupt instruction in one of a number of tasks, the transmitter of the corresponding CPU outputs an interrupt request to each of the receivers of the remainder of the CPU's. Thus, the remainder of the tasks are suspended. An interrupt controller which is included in the operating system, takes over the control of the CPU's and the tasks in response to the transmission and the reception of the interrupt request by the above-mentioned CPU. A task status determining program initiates to examine each status of said tasks when the interrupt controller ascertains suspension of each of the tasks.

11 Claims, 1 Drawing Sheet

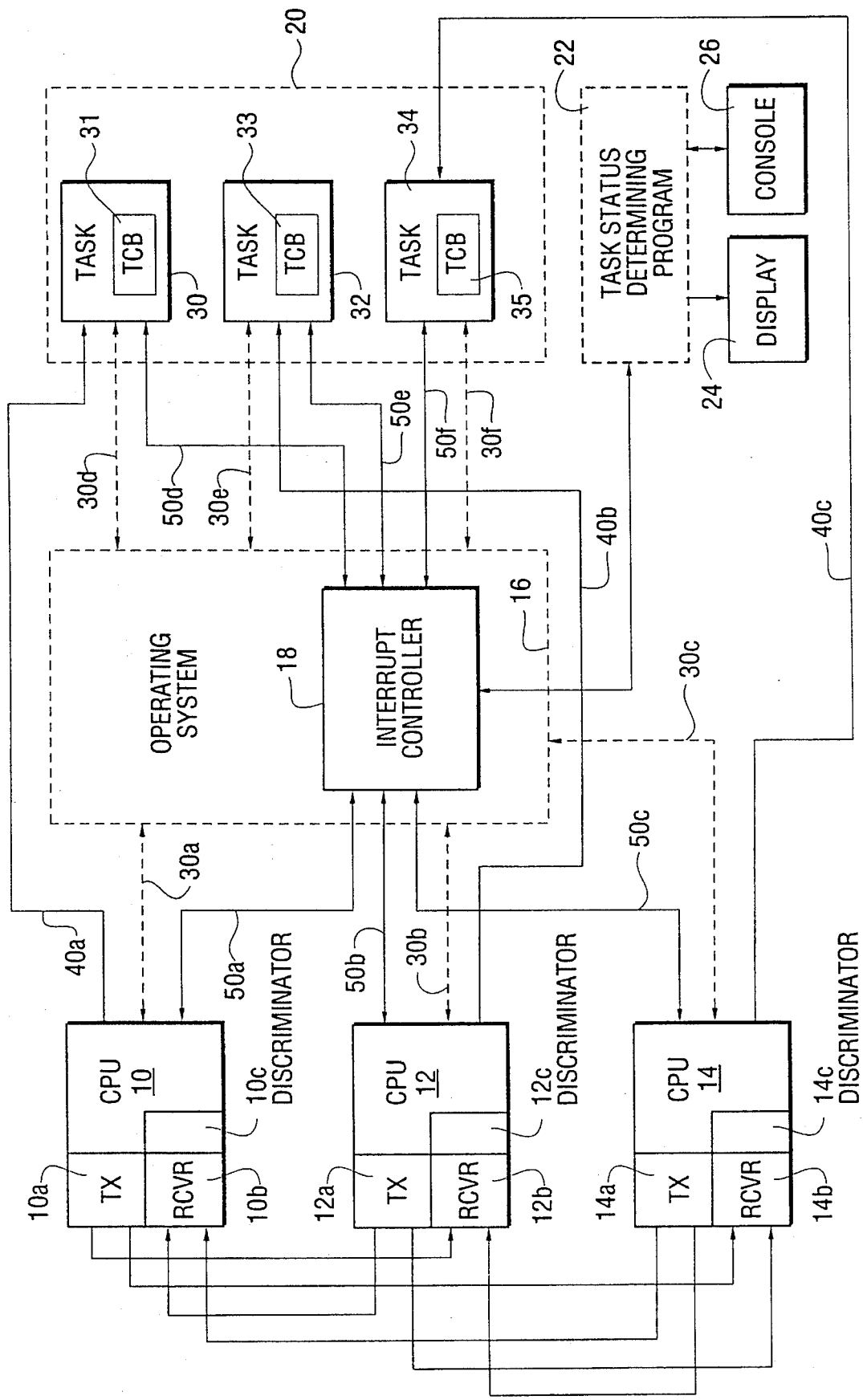

# SYSTEM FOR EXAMINING STATUSES OF TASKS WHEN ONE TASK IS INTERRUPTED IN DATA PROCESSING SYSTEM

This application is a continuation of application Ser. No. 07/612,666, filed Nov. 14, 1990, now abandoned.

BACKGROUND OF THE INVENTION

1. Field of the Invention

The present invention relates to a system for determining or specifying the status of a number of tasks when one of the tasks is stopped. More specifically, the present invention relates to such a system wherein multiple tasks are assigned to multiple CPU's (central processing units) on a one-to-one basis in a tightly-coupled multiprocessor arrangement which is provided with a plurality of CPU's sharing a single memory.

The present invention is particularly directed to debugging and/or evaluating user's programs to be executed by a parallel machine of SIMD (Single-Instruction stream Multiple-Data stream) type.

2. Description of the Prior Art

In order to speed the execution of a user's program, one known approach is to use a multitasking technique wherein tasks are assigned to a plurality of CPU's on a one-to-one basis and are executed in parallel thereby.

When a user's program is to be debugged and/or evaluated in the above-mentioned multitasking system, it is necessary, when one task is stopped, to suspend or temporarily stop the other tasks in order to examine the status of each of the other tasks.

According to a conventional method, debugging and/or evaluation of a user's program is implemented by means of software only. More specifically, in the event that one task is stopped, the CPU dedicated thereto initiates to execute an interrupt control program of the stopped task and suspends the other tasks through the use of software. After discontinuing the other tasks, each status thereof is examined.

As mentioned above, since the suspending operation of each of the other tasks is carried out only through software, the known method has inherently encountered a problem in that a considerable period of time is required to subsequently suspend the other tasks after one of the same has been stopped. This means that the other tasks continue to be undesirably executed for a relatively long period following the stoppage of one of the tasks, and hence the statuses of the other tasks are unable to be observed exactly.

SUMMARY OF THE INVENTION

It is an object of the present invention to provide a system which utilizes hardware in a manner which, at the time one of a plurality of tasks is stopped, each execution of other related tasks is brought into a quiescent state and the statuses of the same examined.

Another object of the present invention is to provide a system which includes a transmitter and receiver within each of a plurality of CPU's and which uses the same to rapidly terminate task execution and determine, in response to the stoppage of one task, the respective statuses of the remaining ones.

In brief, the above objects are achieved by a computer system which includes multiple CPU's and multiple tasks. The multiple CPU's are assigned to the multiple tasks on a one-to-one basis and execute corresponding tasks under the control of an operating system. Each of the CPU has a transmitter and a receiver. Each transmitter of the CPU's is connected to the receivers in the remainder of the CPU's. The CPU's are arranged so that, in response to the execution of a stop instruction in one of a number of tasks, the transmitter of the corresponding CPU outputs an interrupt request to each of the receivers of the remainder of the CPU's. Thus, the remainder of the tasks are suspended. An interrupt controller which is included in the operating system, takes over the control of the CPU's and the tasks in response to the transmission and the reception of the interrupt request by the above-mentioned CPU. A task status determining program initiates to examine each status of the tasks when the interrupt controller ascertains suspension of each of the tasks.

More specifically a first aspect of the present invention comes in a computer system which comprises: memory means, the memory means containing an operating system; a plurality of tasks, the plurality of tasks being stored in the memory means; and a plurality of CPU's, the CPU's being assigned to the tasks on a one-to-one basis and executing corresponding tasks under the control of the operating system and having a transmitter and a receiver, each transmitter of the plurality of CPU's being connected to the receivers in the remainder of the plurality of CPU's, the plurality of CPU's being arranged so that, in response to the execution of a stop instruction in a first of the plurality of tasks, the transmitter of a first of the CPU's outputs an interrupt request to each of the receivers of the remainder of the plurality of CPU's, whereby the remainder of the plurality of tasks are suspended.

A second aspect of the present invention comes in a computer system which comprises: memory means, the memory means containing an operating system which includes an interrupt controller; a plurality of tasks, the plurality of tasks being stored in the memory means; a task status determining means, the task determining means being stored in the memory means; and a plurality of CPU's, the CPU's being assigned to the tasks on a one-to-one basis and executing corresponding tasks under the control of the operating system and having a transmitter and a receiver, each transmitter of the plurality of CPU's being connected to the receivers in the remainder of the plurality of CPU's, the plurality of CPU's being arranged so that, in response to the execution of a stop instruction in a first of the plurality of tasks, the transmitter of a first of the CPU's outputs an interrupt request to each of the receivers of the remainder of the plurality of CPU's; whereby the remainder of the plurality of tasks are suspended, and whereby the interrupt controller takes over the control of the plurality of CPU's and the plurality of tasks in response to the transmission and reception of the interrupt request by the CPU's, the task status determining means examining each status of the tasks when the interrupt controller ascertains suspension of each of the tasks.

BRIEF DESCRIPTION OF THE DRAWINGS

The features and advantages of the present invention will become more clearly appreciated from the following description taken in conjunction with the accompanying drawing and in which the single drawing is a block diagram showing an embodiment of the present invention.

DETAILED DESCRIPTION OF THE PREFERRED EMBODIMENTS

A preferred embodiment of this invention will be discussed with reference to the figure attached to this specification.

The arrangement shown in the figure, includes a tightly-coupled multiprocessor system which comprises three CPU's 10, 12 and 14, and a main memory (not shown) wherein an operating system 16 is stored. An interrupt controller 18 is included in the operating system 16. The term "tightly-coupled multiprocessor system" implies that a single main memory is shared by a plurality of CPU's which are controlled by the same operating system.

The arrangement shown in the figure, further comprises a user's programs 20 (only one is illustrated in this particular embodiment for the sake of convenience), a task status determining program 22, a display 24, and a console 26. The user's program 20 includes a plurality of tasks 30, 32 and 34 which are respectively allocated to the CPU's 10, 12 and 14 and executed thereby. It should be noted that the task status determining program 22 is a program prepared by a user.

The CPU 10 includes a transmitter (TX) 10a, a receiver (RCVR) 10b and a task discriminator 10c. Similarly, each of the other two CPU's 12 and 14 includes a transmitter (12a, 14a), a receiver (12b, 14b) and a task discriminator (12c, 14c). The transmitter of one CPU (10, 12 or 14) is coupled to each of the receivers of the other two CPU's by way of dedicated signal lines (no numerals).

Before a stop is encountered in one of the tasks 30, 32 and 34, the operating system 16 excepting the interrupt controller 18, controls the CPU's 10, 12 and 14 and the tasks 30, 32 and 34 via signal lines 30a–30f in a manner known to those skilled in the art.

The operation of the arrangement shown in the figure will be described in detail.

It is assumed that the task 30 has included a stop instruction therein. In the event that the CPU 10, which is assigned to the task 30, executes the stop instruction, the task 30 is stopped and control of the CPU 10 by the interrupt controller 18 is initiated via a line 50a. The interrupt controller 18 also initiates to manage the task 30 via a line 50d.

In response to the execution of the above-mentioned stop instruction, the CPU 10 causes the transmitter 10a to generate an interrupt request which is sent to the receivers 12b and 14b. The interrupt request contains an identifier which specifies the user's program 20 and the task 30 in this case. When the CPU 12 is supplied with the interrupt request at the receiver 12a thereof, the discriminator 12c identifies a user's program and a task which has encountered a stoppage 3. In this particular case, the interrupt request is generated by the execution of the stop instruction included in the task 30 of the user's program 20. Therefore, the CPU 12 brings the task 32 into a quiescent state via a signal line 40b, after which operation of the CPU 12 under the interrupt controller 18 begins. Further, the interrupt controller 18 initiates to manage the task 32 via a line 50e. Similarly, the CPU 14 interrupts the task 34 via a line 40c in response to the interrupt request applied from the transmitter 10a to the receiver 14b. Following this, the CPU 14 suspends the task 34, and control of the CPU 14 by the interrupt controller 18 is initiated via a line 50c. The interrupt controller 18 also starts to manage the task 34 via a line 50f.

In the above case, since the stop instruction included in the task 30 is firstly executed, a line 40a is not used for suspending the operation of the task 30. The interrupt controller 18 identifies which task is firstly stopped through checking of each of task control blocks (TCBs) 31, 33 and 35 within the task 30, 32 and 34, respectively.

When the interrupt controller 18 ascertains the quiescent state of each of the tasks 30, 32 and 34, the controller 18 allows the task status determining program 22 to refer to or observe each of task control blocks (TCBs) within the tasks 32 and 34. Thus, the task statuses of the tasks 32 and 34 can be exhibited on the display 24 or the console 26.

After the examination of the task statues of the suspended tasks 32 and 34, the interrupt controller 18 finishes control of the CPU's 10, 12 and 14 as well as the tasks 30, 32 and 34. Thereafter, the arrangement shown in the figure returns to the normal operation thereof, viz., the operation prior to the stop encounter.

Although only one user's program is shown in the figure, it is within the scope of the instant invention to include a plurality of user's programs which contains a plurality of tasks.

While the foregoing description describes one embodiment according to the present invention, the various alternatives and modifications possible without departing from the scope of the present invention, which is limited only by the appended claims, will be apparent to those skilled in the art.

What is claimed is:

1. A computer system, comprising:

memory means, said memory means containing an operating system;

a plurality of tasks, said plurality of tasks being stored in said memory means; and a plurality of CPUs, said CPUs being assigned to said tasks on a one-to-one basis and executing corresponding tasks under the control of said operating system, each of said CPUs having a transmitter and a receiver for transmitting and receiving interrupt requests via dedicated signal lines, each transmitter of said CPUs being connected to each of the receivers in the remainder of said CPUs, the transmitter of a first of said CPUs outputting an interrupt request to each of the receivers of the remainder of said plurality of CPUs in response to the execution of a stop instruction in a first of said plurality of tasks, the execution of the stop instruction causing the first CPU to stop the first task, said remainder of said CPUs being responsive to said interrupt request to rapidly suspend the remainder of said plurality of tasks.

2. A computer system as claimed in claim 1, wherein said operating system includes an interrupt controller, said interrupt controller taking over control of said plurality of CPUs and said plurality of tasks in response to the stoppage of said first task by said first CPU and suspension of the remainder of said plurality of tasks by said remainder of CPUs.

3. A computer system as claimed in claim 2, further comprising:

a task status determining means, said task status determining means being stored in said memory means and examining each status of said tasks when said interrupt controller ascertains suspension of each of said tasks.

4. A computer system as claimed in claim 3, wherein the examining of each task status is implemented by observing a task control block included in each of said tasks.

5. A computer system, comprising:

memory means, said memory means containing an operating system which includes an interrupt controller;

a plurality of tasks stored in said memory means;

a task status determining means also stored in said memory means; and a plurality of CPUs, said CPUs being assigned to said tasks on a one-to-one basis and executing corresponding tasks under the control of said operating system, each CPU having a transmitter and a receiver for transmitting and receiving interrupt requests via dedicated signal lines, each transmitter of said CPUs being connected to the receivers in the remainder of said CPUs, the transmitter of a first of said CPUs outputting an interrupt request to each of the receivers of the remainder of said plurality of CPUs in response to the execution of a stop instruction in a first of said plurality of tasks, said remainder of CPUs being responsive to said interrupt request to rapidly suspend the remainder of said plurality of tasks, said interrupt controller taking over control of said plurality of CPUs and said plurality of tasks in response to the transmission of said interrupt request by said first CPU and suspension of the remainder of said plurality of tasks by the remainder of said CPUs, said task status determining means examining each status of said tasks when said interrupt controller ascertains suspension of each of said tasks.

6. A computer system as claimed in claim 5, wherein the examining of each task status is implemented by observing a task control block included in each of said tasks.

7. A computer system, comprising:

a first CPU executing a first task under control of an operating system;

a second CPU executing a second task under control of the operating system;

a memory containing the operating system and a program, the program including the first and second tasks;

a transmitter in said first CPU;

a receiver in said second CPU; and a dedicated signal line connecting the transmitter to the receiver;

wherein, in response to a stop instruction contained in the first task, the first CPU stops the first task and causes the transmitter to send an interrupt request signal to the receiver, the second CPU suspending the second task in response to the interrupt request signal.

8. A computer system as recited in claim 7, further comprising an interrupt controller which controls the first CPU after execution of the stop instruction and the second CPU after suspension of the second task.

9. A computer system, comprising:

memory means for containing an operating system;

a program, containing a plurality of tasks, stored in said memory means;

a plurality of CPUs corresponding to said tasks on a one-to-one basis, each CPU executing its corresponding task under control of said operating system, each CPU having a transmitter, a receiver, and a discriminator, each CPU being responsive to a stop instruction in its corresponding task to stop the corresponding task and cause its transmitter to issue an interrupt request signal via dedicated signal lines to the receivers in the other CPUs, each discriminator of the other CPUs identifying the program using information included in the interrupt request signal, each of the other CPUs being responsive to the identification of the program for rapidly suspending its corresponding task, whereby the plurality of tasks of the program are all suspended; and an interrupt controller interacting with said CPUs and said progress, said interrupt controller being included in said operating system and responsive to the suspension of the plurality of tasks for taking over control of said CPUs and said program.

10. A computer system as claimed in claim 9, further comprising a task status discriminating means for examining each status of said tasks when said interrupt controller takes control of said CPUs.

11. A method of debugging a program on an SIMD (Single-Instruction stream Multiple-Data stream) computer system, comprising the step of:

executing a plurality of tasks from a program contained in a memory on a corresponding plurality of CPUs under control of an operating system;

stopping one of the CPUs in response to a stop instruction contained within the task corresponding to the one of the CPUs;

issuing an interrupt request signal from a transmitter in the one of the CPUs to receivers in the other CPUs over dedicated signal lines;

suspending the tasks corresponding to the other CPUs in response to the interrupt request; and debugging the program by examining a status of each of said suspended tasks.

* * * * *